United States Patent
Capellmann et al.

(10) Patent No.: US 9,618,219 B2
(45) Date of Patent: Apr. 11, 2017

(54) AIR INTAKE—DRAINAGE FEATURES

(71) Applicant: Halla Visteon Climate Control Corp., Daejeon (KR)

(72) Inventors: Christoph Capellmann, Würselen (DE); Detlef Handwerk, Köln (DE); Johannes Stausberg, Köln (DE); Evzi Duka, Köln (DE); Michael Fietz, Aachen (DE)

(73) Assignee: HANON SYSTEMS, Daejeon-si (KR)

( * ) Notice: Subject to any disclaimer, the term of this patent is extended or adjusted under 35 U.S.C. 154(b) by 47 days.

(21) Appl. No.: 14/723,559

(22) Filed: May 28, 2015

(65) Prior Publication Data

US 2015/0345807 A1    Dec. 3, 2015

(30) Foreign Application Priority Data

May 28, 2014 (DE) ...................... 10 2014 107 580.3
May 18, 2015 (DE) ...................... 10 2015 107 708.6

(51) Int. Cl.

| *B01D 45/08* | (2006.01) |
|---|---|
| *B60H 1/00* | (2006.01) |
| *F24F 3/16* | (2006.01) |
| *B01D 27/00* | (2006.01) |
| *B60H 1/32* | (2006.01) |
| *B01D 46/00* | (2006.01) |

(Continued)

(52) U.S. Cl.
CPC ........ *F24F 3/1603* (2013.01); *B01D 46/0002* (2013.01); *B60H 1/00028* (2013.01); *B60H 1/00514* (2013.01); *B60H 1/00521* (2013.01); *B01D 46/0005* (2013.01); *B01D 46/0031* (2013.01); *B01D 46/4263* (2013.01); *B60H 2001/00085* (2013.01)

(58) Field of Classification Search
CPC ........ B01D 45/08; B01D 27/00; B01D 46/00; B01D 39/14; B60H 1/00; B60H 1/32; F24F 3/16; C02F 1/28
USPC ......... 55/385.3, 434.2, 467.1, 490.1; 165/63, 165/104.11
See application file for complete search history.

(56) References Cited

U.S. PATENT DOCUMENTS

| 5,076,821 A * | 12/1991 | Bruhnke | ............... B60H 3/0625 454/158 |
|---|---|---|---|
| 2009/0032216 A1* | 2/2009 | Kim | ................... B60H 1/00064 165/63 |

(Continued)

*Primary Examiner* — Jacob T Minskey
*Assistant Examiner* — Minh-Chau Pham
(74) *Attorney, Agent, or Firm* — Fraser Clemens Martin & Miller LLC; James D. Miller

(57) ABSTRACT

An air conditioning system includes an intake housing with a fresh air opening and a recirculation air opening, a filter housing to admit an air filter and a fan housing with a fan for intake by suction of air through the intake housing and directing the air through the filter housing. The fresh air opening and the recirculating air opening are aligned in a common horizontal direction and in a vertical direction one above the other. The recirculating air opening is situated in the gravitational direction beneath the fresh air opening. Between the fresh air opening and the recirculating air opening a separation area is configured, with drainage means in such a way that the fluid penetrating into the fresh air opening, when flowing over the drainage means is directed past the recirculating air opening in a receiving area placed below the recirculating air opening.

9 Claims, 3 Drawing Sheets

(51) Int. Cl.
    *B01D 39/14*     (2006.01)
    *C02F 1/28*     (2006.01)
    *B01D 46/42*     (2006.01)

(56) References Cited

U.S. PATENT DOCUMENTS

| | | | |
|---|---|---|---|
| 2009/0311951 A1* | 12/2009 | Walkinshaw | B60H 3/0007 451/261 |
| 2012/0317937 A1* | 12/2012 | Koch | B60H 1/00028 55/320 |
| 2015/0151606 A1* | 6/2015 | Harke | B60H 1/00321 55/434.2 |
| 2015/0224436 A1* | 8/2015 | Klein | B01D 46/0002 55/421 |

* cited by examiner

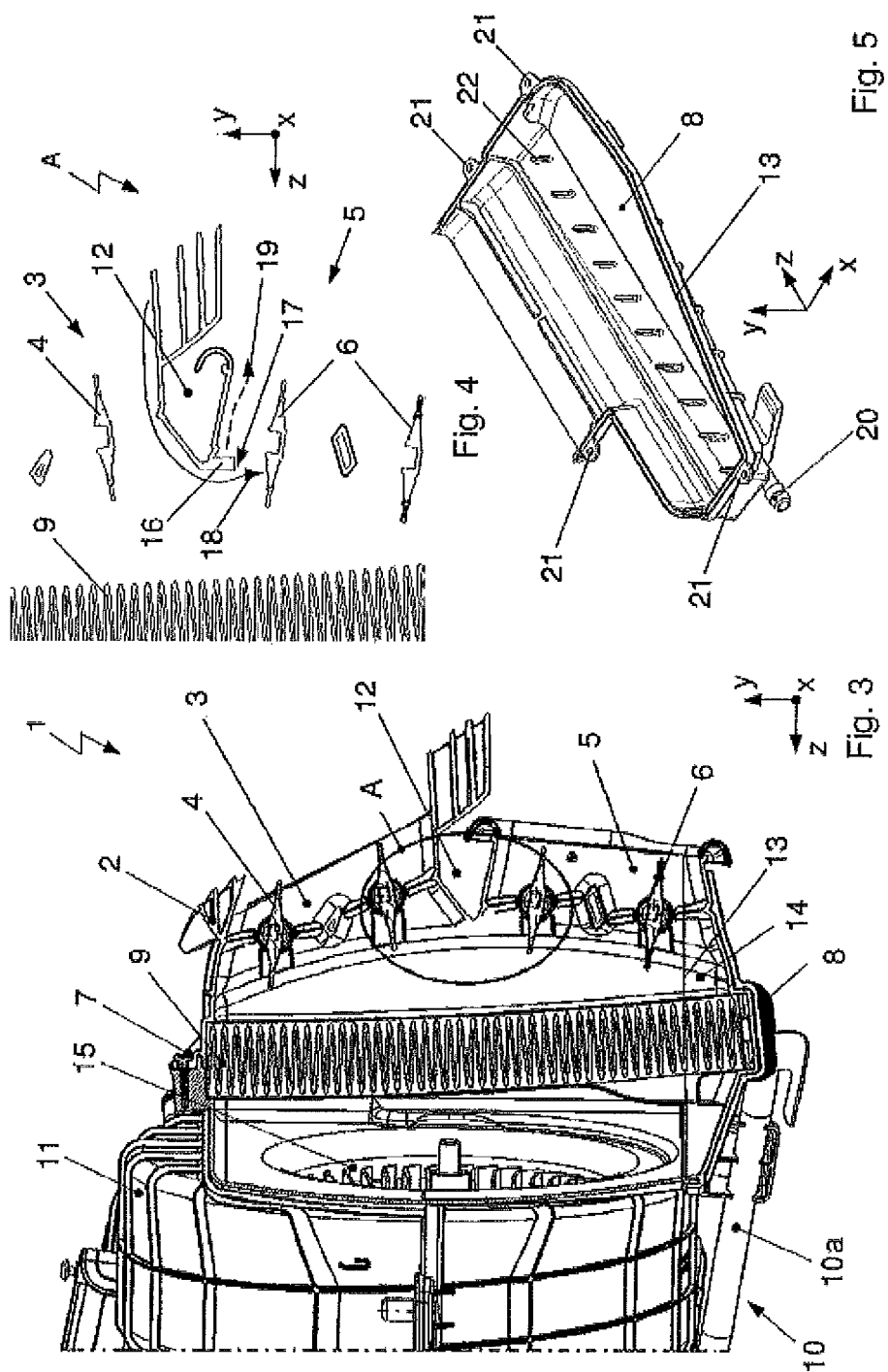

AIR INTAKE—DRAINAGE FEATURES

CROSS-REFERENCE TO RELATED APPLICATIONS

This application claims priority to German Patent Application No. 10 2014 107580.3 filed on May 28, 2014, and German Patent Application No. 10 2015 107708.6 filed on May 18, 2015, the disclosures of which are incorporated herein by reference in their entirety.

FIELD OF THE INVENTION

The invention relates to an air intake of a motor vehicle air conditioning system with a drainage function for the fluid penetrating into the air conditioning system. The air conditioning system exhibits an intake housing with a fresh air opening and a recirculation air opening, a filter housing to admit an air filter and a fan housing with a fan for intake by suction of air through the intake housing and directing the air through the filter housing.

BACKGROUND OF THE INVENTION

Prior-art air conditioning systems are known, in which, especially when the air to be treated is cooled, as the air is flowing over a condenser of a refrigerant circuit, water condensed out of the air is directed through a drainage system in the vicinity of the vehicle. However, water that penetrates into a housing of the air conditioning system from outside, for example through a fresh air intake or opening, is mostly not removed via a drainage system. The water that has penetrated via the fresh air intake into the housing of the air conditioning system when a car is washed collects within the intake and then can get into a passenger compartment of the vehicle.

Traditional air conditioning systems exhibit two separate air intakes for operation with recirculating air, operation with fresh air, or hybrid operation with recirculating air and fresh air. Depending on the requirement, air is brought by suction through the fresh air intake from the area around the motor vehicle, or through a recirculating air intake from the passenger compartment.

In air conditioning systems known from prior art, the air intakes for fresh air and recirculated air are mostly aligned to be opposite one another. The fresh air intake points in the direction of a front side or a bulkhead of the vehicle, while the recirculating air intake points in the direction of the passenger compartment.

In other known air conditioning systems, the air intakes for the fresh air and recirculating air are directed parallel toward the head end. The recirculating air intake is placed vertically beneath the fresh air intake. The recirculating air intake in this case points in the direction of the bulkhead, and not in the direction of the passenger compartment.

Where the air intakes are placed facing the bulkhead of the vehicle, and the recirculating air intake faces vertically, directly beneath the fresh air intake, a danger exists that the water getting through the fresh air intake into the housing of the air conditioning system from around the vehicle will come directly into the passenger compartment via the recirculating air intake.

The water that gets into the housing, especially through the fresh air intake, is thus to be specifically directed, and brought out of the housing again. However, placing the fresh air intake and the recirculated air intake one above the other, makes it difficult for the penetrated water to be specifically directed away.

In air conditioning systems known from prior art, additionally the air filter is placed in an area of the housing in which the water getting through the fresh air intake can move onward. The air filter, which is to be situated within the housing, so as to be easily replaceable, can be accessed for service through an opening in the housing. The opening can be closed again and sealed against outflowing water.

Customarily, to close the opening again, a cover element is used with additional seals, which are separately inserted on the cover element, or formed directly on the cover element in one step of the two-component spraying process.

In air conditioning systems known from prior art, it is characteristic that the arrangements of the fresh air intake and recirculating air intake do not point in one direction, or insufficient protection is provided to prevent water from the surrounding area from passing into the passenger compartment, via the recirculating air intake placed beneath the fresh air intake.

In addition, the openings for replacement of the air filter are closed by covering elements, which exhibit additional elements for sealing a separation site between the air intake housing and the covering element, or are manufactured in an expensive procedure. The additional elements or the expensive manufacturing process result in higher costs in producing and maintaining the air conditioning system.

SUMMARY OF THE INVENTION

The task of the invention is to make available an air conditioning system for a motor vehicle, in which, via an air intake, especially via a fresh air intake, fluid that gets into the housing can be effectively and specifically drained away, so that no share of the penetrating fluid gets into the passenger compartment, especially through the recirculating air intake. In addition, the fluid should be able to be directed reliably out of the housing.

It should be simple to replace the air filter through an opening made in the housing. The air conditioning system should be configured without additional and complex components, such as for sealing the housing against the outside, and in addition with a minimum number of necessary components, to reduce the space needed for the system, and also to reduce the manufacturing costs, the material expenditures, the installation expense and the maintenance expense.

The problem is solved by the object with the features of the independent patent claim. Additional embodiments are provided in the dependent patent claims.

The problem is solved by an invention-specific air intake of a vehicle air conditioning system. The air conditioning system exhibits an intake housing with a fresh air opening and a recirculating air opening, a filter housing to admit an air filter and a fan housing with a fan for intake by suction of air through the intake housing and for directing the air through the filter housing.

According to an embodiment of the invention, the fresh air opening and the recirculating air opening point in a common horizontal direction and are situated above each other vertically. The recirculating air opening is situated, as gravity directs, below the fresh air opening. Between the fresh air opening and the recirculating air opening, a separation area is configured with means for drainage, so that fluid penetrating into the fresh air opening, when flowing over the drainage means, past the recirculating air opening, is directed to a receiving area situated below the recirculating air opening. The receiving area is configured to collect and store fluid, as well as with an opening to drain away the fluid.

The drainage means configured in the area of the air intake of the air conditioning system divert the fluid penetrating into the fresh air intake, and prevent the fluid from passing out through the recirculating air intake.

According to an embodiment of the invention, the receiving area is configured on an underside of the intake housing and of the filter housing. It is advantageous for the receiving area to be pan-shaped and the opening for diverting the collected fluid to exhibit a connecting element as a hydraulic link to a channel of a drainage system.

According to a further development of the invention, the filter housing is configured with a closing element for opening and closing an opening made in the filter housing, especially for removal and insertion of the air filter.

The receiving area is preferably integrated into the closing element of the filter housing.

The closing element is advantageously configured to be pan-shaped with a wall that goes from the bottom upwards in the vertical direction, with the wall terminating on the upper side in an edge.

Also, the elevation of the closing element configured as a cover for closing the filter opening without auxiliary sealing elements prevents penetration of fluid into the passenger compartment. The pan-shaped configuration of the closing element makes it possible to collect, store, and drain a large quantity of fluid getting into the air intake housing, wherein the volume enclosed by the closing element as a storage area admits a certain quantity of the penetrated fluid, which cannot immediately be drained off.

The closing element can advantageously be manufactured as a one-component element without forming additional sealing elements, from a hard plastic, especially by injection molding.

According to one advantageous embodiment of the invention, the edge of the closing element wall, in the installed state of the housing of the air conditioning system, seals on an edge of the wall of the filter housing. The edges of the walls of the closing element and the filter housing that adjoin one another thus form a separation plane.

A further embodiment of the invention consists in configuring the drainage means situated in the separation area as a connection element with a drip-off edge, wherein the connection element points vertically from an upper side of the recirculating air opening, projecting into the recirculating air opening.

The drip-off edge advantageously is configured on a free end of the connection element, wherein the free end is directed vertically downward and, via a bound end in the separation area, the connection element is connected with the intake housing.

The connection element preferably is configured to extend over the entire upper side of the recirculating air opening pointing in a horizontal direction.

The connection element with the drip-off edge, as a drainage means with a defined edge in the inner area of the recirculating air opening, prevents adherence of the fluid, especially of water, on a wall of the housing, preferably consisting of plastic, and the resulting issuance of fluid from the housing of the air conditioning system in the area of the recirculating air opening.

In summary, the invention-specific air intake with a drainage function exhibits various advantages:

1. Preventing fluid, especially water, from getting from the recirculating air opening into the passenger compartment, when the fresh air opening and recirculating air opening are situated one above the other, by specific and effective drainage of the fluid.
2. Cost minimization by obviating additional components, such as sealing elements.
3. Cost minimization for manufacture and design, by components being less complex, since, for example, one-component injection molded parts can be used instead of two-component injection molded parts.

BRIEF DESCRIPTION OF THE DRAWINGS

Additional particulars, features and advantages of embodiments of the invention are derived from the specification of embodiment examples that follows, with reference to the pertinent drawings. Shown are:

FIG. 3: The air conditioning system as per FIG. 1 in a fragmentary elevational left side sectional depiction.

FIG. 4: a detail of the sectional depiction from FIG. 3, with a separation area between the fresh air opening and the recirculating air opening of the air conditioning system of FIG. 1.

FIG. 5: a closing element of the filter housing of the air conditioning system of FIG. 1 in a top perspective view.

DETAILED DESCRIPTION OF EXEMPLARY EMBODIMENTS OF THE INVENTION

Figure 1:
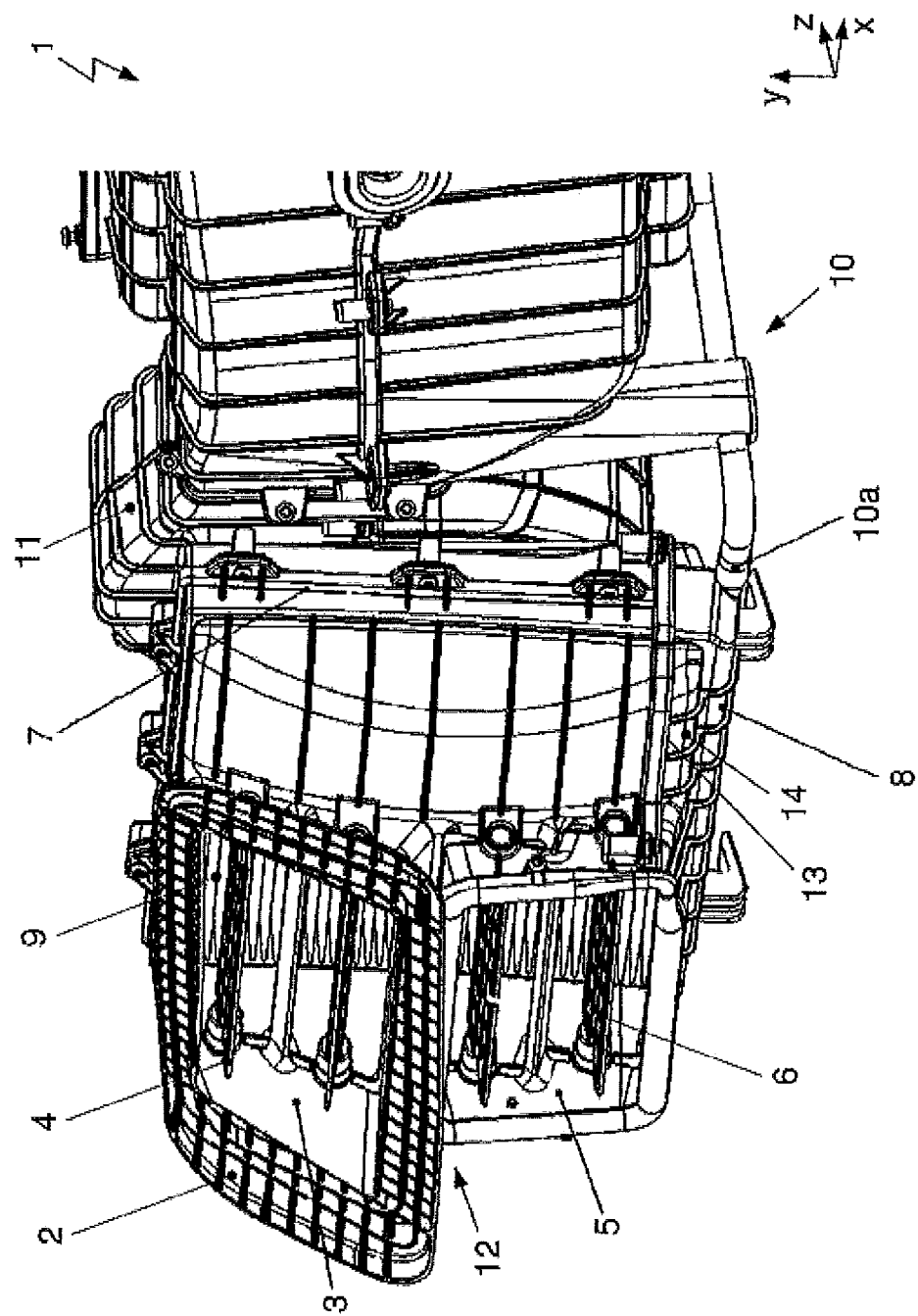
FIG. 1: An air conditioning system with an intake housing with a fresh air opening and recirculating air opening placed one over the other, a filter housing and a fan housing, as well as a drainage system, in a fragmentary front perspective view.
Figure 2:
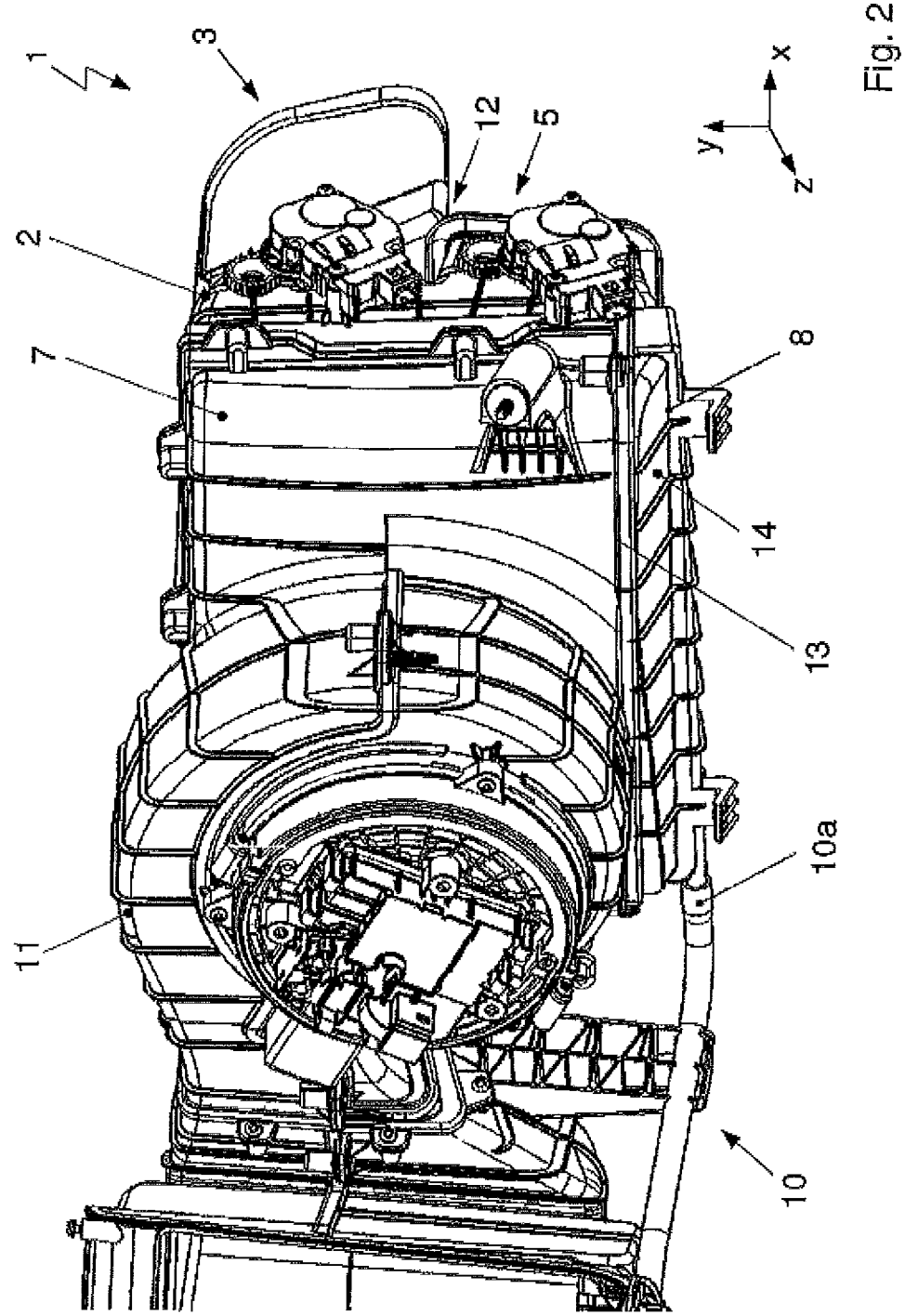
FIG. 2: The air conditioning system as per FIG. 1 in a fragmentary back perspective view.

FIGS. 1 and 2 depict an air conditioning system 1 with an intake housing 2, a filter housing 7, and a fan housing 11, as well as a drainage system 10 in a perspective view of the front side, as per FIG. 1, and of the rear side, as per FIG. 2. The intake housing 2 is configured with a fresh air opening 3 and a recirculating air opening 5, which are placed one over the other in the vertical direction y, and through which the air to be treated is brought essentially in a horizontal direction z by suction into the air conditioning system 1. The fresh air opening 3 and the recirculating area opening 5 are situated in a plane fixed by the horizontal direction x and the vertical direction y.

Depending on the requirement and operational mode of the air conditioning system 1, the fresh air opening 3 and the recirculating air opening 5 are able to be closed and opened by means of air flaps 4, 6. The fresh air opening 3 or the recirculating air opening 5 are also designated according to the desired flow direction of the air as a fresh air intake 3 or a recirculating air intake 5.

The air is brought in the flow direction through the fresh air opening 3 and/or the recirculating air opening 5 into the intake housing 2 by suction, and then directed via the air filter 9 placed in filter housing 7 into the fan housing 11.

When the air flows over a condenser (not depicted) situated within the housing 11, thus being cooled and demoisturized, the moisture of the air condenses on the surfaces of the condenser. The moisture is drained off via the drainage system 10 from the housing 11. The drainage system 10 is so configured, that the moisture can flow off by gravity.

Along with moisture contained in air, additional fluid or moisture, like rain water, snow or water from car washes, can get through the fresh air opening 3 into the intake housing 2. To prevent the fluid from getting via the air flow directed through the air conditioning system 1 or via the recirculating air opening 5 into the passenger compartment, the fluid getting into intake housing 2 is to be specifically drained off.

The fluid that has gotten into the intake housing 2 is collected in a receiving area 14 formed on the underside of the intake housing 2 and of the filter housing 7, and drained off. The pan-shaped or hopper-shaped receiving area 14 empties at the lowest point into a hydraulic connection of the drainage system 10, which is configured as a channel 10a, especially as a pipe or tube.

The receiving area 14 is integrated within a closing element 8 of the filter housing 7. The closing element 8 is connected in water-tight fashion as the element that couples the filter housing 7 with the channel 10a, when installing the air conditioning system 1, as well as vis-à-vis the filter housing 7 and also vis-à-vis the channel 10a. The closing element 8 is preferably secured with clip devices on the filter housing 7 in the area of the separation plane 13. Alternatively, the closing element 8 can also be attached to the filter housing 7 by screws, clamps or the like.

The fluid that has gotten through the fresh air intake 3 into the intake housing 2, and thus into the air conditioning system 1, is directed via drainage means in a separation area 12 situated between the fresh air opening 3 and the recirculating air opening 5, past the recirculating air opening 5 to the receiving area 14. The fluid that has penetrated is consequently directed downward in the vertical direction y, without flowing via the recirculating air opening 5, out of the intake housing 2.

FIGS. 3 and 4 show the air conditioning system 1 in a sectional depiction of the left side elevational view, with especially the separation area 12, between the fresh air opening 3 and the recirculating air opening 5, being depicted in detail.

By means of a fan 15, the air to be treated is brought in by suction essentially in a horizontal direction z through the fresh air opening 3 and/or the recirculating air opening 5 into the intake housing 2, and directed via an air filter 9 situated in the filter housing 7 into the fan housing 11. The air flaps 4, 6 are placed in the opened setting.

The fluid that has gotten through the fresh air opening 3 into the intake housing 2 is directed with the aid of a drainage means or component 16, 17 in the separation area 12 within the intake housing 2, past the recirculating air opening 5 in the vertical direction y downward, and thus by gravity to the receiving area 14, and collected in the receiving area 14. The fluid that has collected within the dish-shaped or pan-shaped receiving area 14 is drained away through the channel 10a of the drainage system 10 into the area surrounding the air conditioning system 1 and the motor vehicle.

The separation plane 13 formed between the filter housing 7 and the closing element 8 thus simultaneously represents a maximum filling level for the collected fluid. In the assembled state of the intake housing 2, the filter housing 7 and the closing element 8 adjoin each other in the separation plane 13 in sealing fashion. The imperviousness for water relates to water flowing above the level. Since, however, no additional sealing elements are to be provided, the level of the collected water should be below the separation plane 13.

The closing element 8 is configured as a cover of the filter housing 7 closing an opening. The opening within the filter housing 7 makes it easy to replace the air filter 9 situated within the filter housing 7.

Thus, the closing element 8 is configured on the one hand to admit and collect, or to temporarily store a larger quantity of fluid that has gotten into the intake housing 2, and to drain off the fluid. On the other hand, the closing element 8 locks a service opening for replacing the air filter 9. Consequently, the closing element 8 of the air conditioning system 1 exhibits a storage area for penetrated fluid, which, for example, is not able to be drained away immediately.

The pan-shaped configuration of the closing element 8 makes it possible for the filter housing 7 to be configured without seals in the area of the separation plane 13, since, despite admitting a large quantity of fluid, the filling level of the fluid is below the separation plane 13. By being configured without seals, what is meant is that on the contact surfaces of the filter housing 7 and of the closing element 8, no additional sealing elements, such as flat seals, profile seals, or sealing cords, are to be placed. The closing element 8 is also not to be provided with an additional sealing element, which, for example, results in a dual-component housing or a dual-component element. The closing element 8 can advantageously be manufactured merely of a hard plastic such as by injection molding.

FIG. 4 shows in detail the separation area 12 between the fresh air opening 3 and the recirculating air opening 5. The separation area 12 is limited in the vertical direction y by the air filter 9.

The air flows between the air flaps 4, 6 placed in the opened setting into the fresh air opening 3 and/or the recirculating air opening 5, into the intake housing 2 and is directed to the air filter 9. Fluid getting into the intake housing 2 flows along in a flow direction 18 at a lower level of the fresh air opening 3 and is directed via the drainage means 16, 17 past the recirculating air opening 5, to the receiving area 14. The designations of below, down, and under, or upper, above or up relate to the direction and arrangement in the vertical direction y and thus by gravity.

A connection element 16 configured as the drainage means 16 prevents fluid that has gotten into the intake housing 2 from flowing in a direction 19 back through the recirculating air opening 5 into the passenger compartment. Without the formation of the connection element 16, the fluid that gets through the fresh air opening 3 and flows along the lower level of fresh air opening 3, especially by adhering on the intake housing 2, made for example of plastic, in the separation area 12, could get through the recirculating air opening 5 out of the air conditioning system 1, opposite to the actual flow direction of the air brought in by suction.

The connection element 16 points in the vertical direction y, on the inner side and thus on the side directed to the air filter 9, as well as situated in the upper area of the recirculating air opening 5. The connection element 16 projects from the upper side of the recirculating air opening 5, into the recirculating air opening 5, without having a hindering effect on the air mass flow directed toward the air filter 9. By upper side, the edge is meant, that points in the vertical direction y upward and to the fresh air opening 3 situated above the recirculating air opening 5. The connection element 16 extends over the entire upper side of the recirculating air opening 5 pointing in the horizontal direction x.

The penetrated fluid is prevented from flowing back through the recirculating air opening 5 by formation of the connection element 16 situated in the interior area of the recirculating air opening 5, with a drip-off edge 17 as further drainage means 17. The drip-off edge 17 is the limit of the connection element 16 on the free end. Next to the free end, the connection element 16 exhibits a bound end, by which the connection element 16 is coupled to the intake housing 2.

The fluid that has penetrated through the fresh air opening 3 into the air conditioning system 1 flows in the flow direction 18 along the lower level of the fresh air opening 3, to the connection element 16, along the connection element 16 to the drip-off edge 17, drips off, and falls past the recirculating air opening 5 into the receiving area 14, in which it is collected and then directed out of the air conditioning system 1.

At the drip-off edge 17, the fluid that flows along is forced to be drop-released, and thus prevents the fluid drops passing the recirculating air opening 5 from flowing out into the passenger compartment.

FIG. 5 shows the closing element 8 of the filter housing 7 in an individual-component depiction.

The pan-shaped closing element 8, exhibits a wall that goes from the base in the vertical direction y with a terminating edge. In the installed state of the filter housing 7, the edge of the closing element 8 adjoins the corresponding edge of the filter housing 7 in sealing fashion. The edges of the wall of the closing element 8 and of the filter housing 7 which adjoin one another form the separation plane 13 of the housing.

By the elevation of the closing element 8, which is also provided to close the filter housing 7, especially the filter opening, and thus through enlargement of the volume of the receiving area 14 for the fluid, without additional seals, the fluid can be prevented from getting into the passenger compartment.

The fluid that collects in the receiving area 14 is drained out via a connection element 20 from the receiving area 14 into the channel 10a situated on the connection element 20. The closed channel 10a, configured, for example, as a hose, over the circumference is connected via the connection element 20 with the closing element 8 in sealing fashion.

The closing element 8 is coupled and mechanically fixed in sealing fashion via connection elements 21 with the filter housing 7. The connection elements 21 can, for example, be screwed, clamped, clipped or plugged for the connection.

The closing element 8 is configured with holding elements 22 for the air filter 9. The holding elements 22 serve as spacer holders of the air filter 9 from the bottom of the closing element 8 in the installed state of the air filter 9 within the filter housing 7. The holding elements 22, shaped identically, are situated to be at uniform distances from each other, and to project out from the bottom.

REFERENCE SYMBOL LIST

1 Air conditioning system
2 Intake housing
3 Fresh air opening, fresh air intake
4 Air flap of fresh air opening 3
5 Recirculating air opening, recirculating air intake
6 Air flap of recirculating air opening 5
7 Filter housing
8 Closing element of filter housing 7
9 Air filter
10 Drainage system
10a Channel
11 Fan housing
12 Separation area between fresh air opening 3 and recirculating air opening 5
13 Separation plane
14 Receiving area
15 Fan
16 Drainage means, connection element
17 Drainage means, drip-off edge
18 Flow direction of fluid with connection element 16 and drip-off edge 17
19 Flow direction of fluid without connection element 16 and drip-off edge 17
20 Connection element of channel 10a
21 Connecting element
22 Holding element of filter 9
x, y horizontal directions
z vertical direction

What is claimed is:

1. An air intake of an air conditioning system of a motor vehicle comprising:
an intake housing having a fresh air opening and a recirculating air opening formed therein, the recirculating air opening aligning with and formed beneath the fresh air opening with respect to a vertical direction of the air conditioning system, each of the fresh air opening and the recirculating air opening configured for receiving air to be brought into the air conditioning system therethrough;
a filter housing in fluid communication with and disposed downstream from the intake housing with respect to a direction of a flow of the air through the air conditioning system, the filter housing configured to receive an air filter;
a fan housing in fluid communication with and disposed downstream from the filter housing with respect to the direction of the flow of the air through the air conditioning system, the fan housing having a fan configured to convey the air through the intake housing and the filter housing;
a separation area formed intermediate the fresh air opening and the recirculating air opening and having a drainage component disposed therein, the drainage component receiving a fluid from the fresh air opening and directing the fluid past the recirculating air opening; and
a receiving area formed on an underside of the intake housing and an underside of the filter housing, the receiving area disposed beneath the recirculating air opening with respect to a vertical direction of the air conditioning system, wherein the filter housing includes a closing element disposed thereon, the closing element selectively opening and closing the filter housing for inserting and removing the air filter with respect to the filter housing, and wherein the receiving area is integral with the closing element.

2. The air intake of claim 1, wherein the receiving area collects the fluid from the drainage component, the receiving area having an opening formed therein configured to drain the fluid therefrom.

3. The air intake of claim 1, wherein the receiving area is pan-shaped.

4. The air intake of claim 1, wherein the receiving area is in fluid communication with a drainage system of the air conditioning system.

5. The air intake of claim 1, wherein the closing element is pan-shaped.

6. The air intake of claim 1, wherein the closing element includes a bottom and a wall extending vertically from the bottom with respect to the vertical direction of the air conditioning system, the wall terminating in an edge.

7. The air intake of claim 6, wherein the edge of the wall engages the filter housing to define a separating plane.

8. The air intake of claim 1, wherein the drainage component includes a connection element depending at a bound end from the intake housing with respect to the vertical direction of the air conditioning system, extending into the recirculating air opening, and terminating in a drop-off edge.

9. The air intake of claim 8, wherein the connection element extends horizontally along an upper side of the recirculating air opening with respect to a horizontal direction of the air conditioning system.

* * * * *